US008851250B2

(12) United States Patent
Heiland

(10) Patent No.: US 8,851,250 B2
(45) Date of Patent: Oct. 7, 2014

(54) ACTIVE VIBRATION ISOLATION SYSTEM

(75) Inventor: Peter Heiland, Raunheim (DE)

(73) Assignee: Integrated Dynamics Engineering GmbH (DE)

( * ) Notice: Subject to any disclaimer, the term of this patent is extended or adjusted under 35 U.S.C. 154(b) by 1016 days.

(21) Appl. No.: 11/697,292

(22) Filed: Apr. 5, 2007

(65) Prior Publication Data

US 2007/0235276 A1 Oct. 11, 2007

(30) Foreign Application Priority Data

Apr. 11, 2006 (EP) .................................... 06007575

(51) Int. Cl.
*F16F 7/10* (2006.01)
*F16F 15/02* (2006.01)
*G05D 19/02* (2006.01)

(52) U.S. Cl.
CPC ............... *G05D 19/02* (2013.01); *F16F 15/02* (2013.01)
USPC ........ 188/378; 188/266.7; 188/376; 188/377; 248/550; 248/638

(58) Field of Classification Search
USPC .......... 188/378, 379, 376–377, 380; 267/136
See application file for complete search history.

(56) References Cited

U.S. PATENT DOCUMENTS

| | | | |
|---|---|---|---|
| 4,870,668 A * | 9/1989 | Frankel et al. ................... 378/34 |
| 5,811,821 A | 9/1998 | Alexander et al. |
| 5,812,420 A | 9/1998 | Takahashi |
| 6,021,991 A | 2/2000 | Mayama et al. |
| 6,128,552 A * | 10/2000 | Iwai et al. ...................... 700/280 |
| 6,213,443 B1 * | 4/2001 | Wakui ............................. 248/550 |
| 6,392,741 B1 * | 5/2002 | Mori et al. ....................... 355/53 |
| 2001/0009264 A1 * | 7/2001 | Houghton et al. ............. 248/550 |
| 2002/0088678 A1 | 7/2002 | Ruckman et al. |
| 2002/0104950 A1 | 8/2002 | Mayama |
| 2002/0170793 A1 * | 11/2002 | Kemeny ......................... 188/378 |
| 2003/0047693 A1 | 3/2003 | Lublin et al. |
| 2003/0090645 A1 | 5/2003 | Kato |
| 2004/0164253 A1 | 8/2004 | Ito |
| 2004/0262110 A1 * | 12/2004 | Noe ............................... 188/379 |
| 2005/0126849 A1 | 6/2005 | Pearson et al. |

FOREIGN PATENT DOCUMENTS

| | | |
|---|---|---|
| JP | 09-074061 A | 3/1997 |
| JP | 11-327657 A | 11/1999 |
| JP | 2002221249 A | 8/2002 |
| JP | 2003-120747 A | 4/2003 |
| JP | 2003-148552 A | 5/2003 |

OTHER PUBLICATIONS

T. Nagira, "Patent Application No. 2007-103397 Office Action", Nov. 11, 2009, Published in: JP.
European Patent Office, "European Office Action for International Application No. 06007575.1-1264", Nov. 10, 2010, Publisher: European Patent Office, Published in: DE.
Yamagishi, T., "JP Application No. 2007-103397 Office Action Dec. 14, 2011", , Publisher: JPO, Published in: JP.

* cited by examiner

*Primary Examiner* — Anna Momper
*Assistant Examiner* — San Aung
(74) *Attorney, Agent, or Firm* — Kaplan Breyer Schwarz & Ottesen, LLP

(57) ABSTRACT

The invention relates to an active vibration isolation system which detects structural vibration of the mass to be isolated via a sensor and also takes account of these disturbance variables.

16 Claims, 2 Drawing Sheets

ACTIVE VIBRATION ISOLATION SYSTEM

FIELD OF THE INVENTION

The invention relates to an active vibration isolation system and to a method for vibration isolation, in which structural vibration of the mass to be isolated, in particular natural-frequency vibration, can be taken into account in the active control.

BACKGROUND TO THE INVENTION

Systems for vibration isolation are known. For example, European Patent Specification EP 927830 B1 discloses a lithographic appliance which is mounted on air bearings for vibration isolation. Vibration isolation systems such as these are used in widely differing fields of engineering, in particular in the field of semiconductor manufacture and for high-resolution imaging systems such as MRI installations and electron beam microscopes.

As manufacturing precision increases, the requirements for vibration isolation systems such as these also become more stringent. Vibration isolation systems have therefore been developed which have active control via actuators in addition to mechanical decoupling of the mass to be isolated, for example by means of air bearings. In vibration isolation systems such as these, position changes of the mass to be isolated, in particular vibration, are detected via sensors. The position change is counteracted via actuators.

Electronic control systems make vibration isolation systems such as these even able to predict position changes caused by disturbance influences and to counteract a possible position change before it occurs.

Known vibration isolation systems such as these have been found to have the disadvantage that the mass to be isolated is regarded as a rigid body and it is not possible to take account of vibration originating from the body, such as natural-frequency vibration of isolated masses, in the control of the vibration isolation system. It has not been possible to include structural vibration such as this with previous control models. In fact, it has been found that any attempt to take account of structural vibration in the drive for the actuators of an active vibration isolation system leads to it not being possible to reduce the structural vibration, and in many cases it is even increased.

In known active vibration isolation systems, the mass to be isolated is therefore normally regarded as a rigid body and is masked out for control purposes, that is to say the vibration of the mass to be isolated itself is ignored in the calculation of compensation signals.

OBJECT OF THE INVENTION

The invention is in contrast based on the object of providing a system and a method for vibration isolation in which the isolation effect is further improved.

In particular, the object of the invention is to provide a vibration isolation system in which structural vibration of the mass to be isolated, in particular natural-frequency vibration, can also be taken into account such that it is even possible to reduce vibration caused by the structure of the supported mass.

SUMMARY OF THE INVENTION

The object of the invention is achieved just by an active vibration isolation system and by a method for vibration isolation as claimed in one of the independent claims.

Preferred embodiments and developments of the invention are specified in the respective dependent claims.

An active vibration isolation system is accordingly provided which comprises at least one mass to be isolated, which is mounted on vibration isolators, in particular air bearings.

For the purposes of the invention, an active vibration isolation system is any vibration isolation system in which regular or irregular position changes of the mass to be isolated are actively counteracted via actuators, irrespective of whether the actuators that are provided for this purpose act on the mass to be isolated or on the bearings of the vibration isolation system. A mass to be isolated also includes a holding device for components or assemblies, for example a vibration-isolated table on which components and assemblies can be arranged such that they are isolated from vibration.

The active vibration isolation system comprises at least one sensor in order to detect position changes, in particular vibration of the mass to be isolated. The sensor need not necessarily detect movements in all spatial directions. Depending on the purpose, it is possible to use sensors which detect movements in two, four or six degrees of freedom.

Any position change, in particular vibration of the mass to be isolated, is counteracted via an actuator which, in one preferred embodiment of the invention, is arranged in or on the bearings of the vibration isolation system. The actuator or actuators is or are in this case driven by a control device which evaluates the signals from the sensors and uses them to calculate correction signals for driving the actuators.

The sensor or sensors for detection of the position changes of the mass to be isolated are in this case preferably located close to the bearings in order not to be influenced by structural vibration of the mass to be isolated, in particular of the table of a vibration isolation system.

The inventors have found that at least one further sensor which is preferably arranged on the mass to be isolated or detects vibration of the mass to be isolated detects structural vibration, includes this in the calculations for the control system, thus making it possible to take this into account. The additional sensor is in this case preferably arranged at a point at a distance from the bearings.

It is therefore possible by a comparison of the sensor or of the sensors which is or are located in the vicinity of the bearings to determine which movement components are caused by structural vibration of the mass to be isolated.

For the purpose of the invention, structural vibration is any vibration or movement component which results from the isolated mass not being an ideal rigid body.

The further sensor is in this case preferably located at least 10 cm, and particularly preferably at least 15 cm, from a bearing.

The vibration isolation system preferably comprises a holder for supporting an object to be isolated, in particular a table. Structural vibration of the holder or of the table can be detected via the at least one further sensor.

Alternatively or in combination, a sensor is provided which detects structural vibration of the object to be isolated. It is therefore possible to take account of structural vibration of the entire mass to be isolated.

In one preferred embodiment of the invention, a compensation signal, which represents the structural vibration of the mass to be isolated, is calculated via the control device which drives the actuator or actuators, and is added to the other compensation signals for active vibration isolation.

Depending on the complexity of the system and the nature of the information about the various degrees of freedom of the vibration it is possible, as provided in one development of the invention, to include an additional transformation in the calculation, in which even further system conditions, in particular the further compensation signals for active vibration isolation, are taken into account for control of the actuators.

Sensors which operate without making contact are preferably used as sensors, in particular capacitive, inductive and/or optical sensors.

Depending on the purpose, the further sensor is also designed to detect structural vibration, in order to detect position changes in at least two, preferably four and particularly preferably six degrees of freedom.

The detection of structural vibration is preferably optimized by the further sensor being as far away as possible from the bearings of the vibration isolation system. For this purpose, it is preferably arranged symmetrically with respect to opposite bearing pairs, and essentially at the same distance from them.

The invention makes it possible to provide an active vibration isolation system which has damping of more than 3 dB, preferably of more than 5 dB and particularly preferably of more than 10 dB even at a low excitation frequency of 5 Hz. Damping of more than 10 dB, preferably of more than 20 dB and particularly preferably of more than 25 dB is possible even at an excitation frequency of 15 Hz.

At the same time, the active vibration isolation system according to the invention allows the provision of systems with a very high load capacity, in particular a load capacity of more than 1000 N, preferably of more than 5000 N, and particularly preferably of more than 10 000 N.

In one preferred embodiment of the invention, in order to avoid the introduction of further disturbance vibration, actuators act on the mass to be isolated without making contact. Electrostatic or magnetic actuators are provided, in particular, for this purpose.

Furthermore, the invention covers a method for vibration isolation in which a mass to be isolated is mounted on vibration isolators and position changes, in particular vibration of the mass to be isolated, are detected via at least one sensor and any position change and/or vibration of the mass to be isolated is counteracted via at least one actuator.

Structural vibration of the mass to be isolated is detected via a further sensor, and is taken into account in the drive for the at least one actuator. In this case, each bearing preferably has one associated actuator. The detection process preferably covers not only vibration of the holder but also structural vibration of the object to be isolated, in particular of the components and assemblies arranged on the vibration isolation system.

The invention makes it possible to provide a platform for vibration-isolated mounting, which is equipped with a system for vibration isolation. One particularly advantageous feature of the system is that no further hardware need be implemented in the system for the actuators. The system can therefore also easily be retrofitted to existing vibration isolation installations.

BRIEF DESCRIPTION OF THE DRAWINGS

The invention will be explained in more detail in the following text with reference to FIG. 1 and FIG. 2 of the drawings, which schematically illustrate one exemplary embodiment of the invention.

DETAILED DESCRIPTION OF THE DRAWINGS

Figure 1:
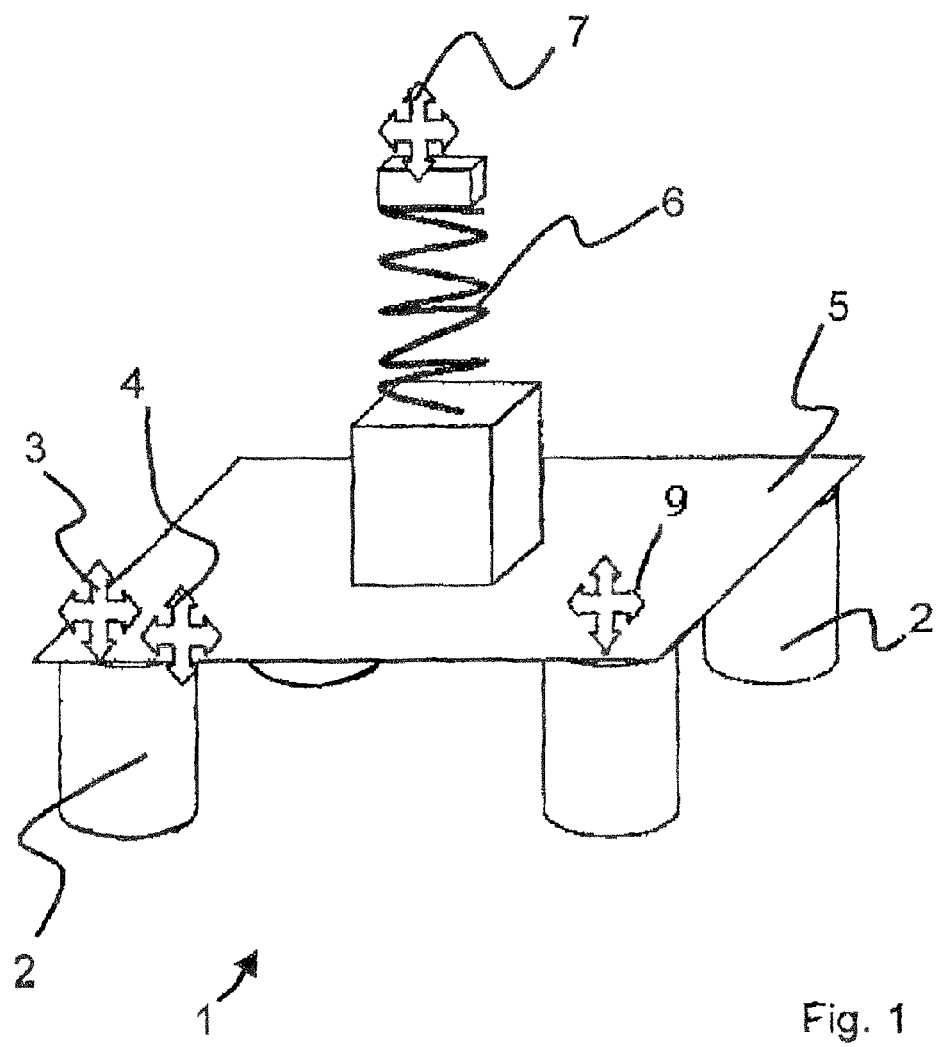
FIG. 1 shows, schematically, the major components of a vibration isolation system according to the invention.

The major components of a vibration isolation system 1 will be explained in more detail with reference to FIG. 1.

In this embodiment, the vibration isolation system 1 comprises four bearings 2, which are in the form of air bearings. A plate 5 is mounted on the air bearings 2 and is used to hold components and assemblies to be isolated.

A sensor 3 is arranged at least substantially in the vicinity of a bearing 2 and detects position changes, in particular vibration, of the plate 5, expediently in three spatial directions. In order to avoid being adversely affected by natural-frequency vibration of the plate 5 or of the object 6 to be isolated, the sensor 3 is arranged close to the bearing. The sensor 2 is connected to the control device (not illustrated) for controlling the actuators 4. The actuators act on the plate, and make it possible to counteract vibration of the system.

The position of the object 6 to be mounted, in this case illustrated schematically as a spring and mass oscillating system, a further sensor 7 is used for detection in the upper area of the object 6 to be mounted. The further sensor 7 is also connected to the control device (not illustrated).

In this configuration, structural vibration of the mass to be isolated can be detected via the further sensor 7. In this case, both structural vibration of the plate 5 and structural vibration of the object 6 to be isolated, which together form the isolated mass, are included.

It is self-evident that structural natural vibration of the mass to be isolated can also be detected at further points in order to further increase the effectiveness of the system, for example by arranging a further sensor (e.g., sensor 9) on the plate, or a plurality of sensors, which are connected to the control device (not illustrated), can be arranged on the object 6 to be isolated, and/or on the plate 5.

Figure 2:
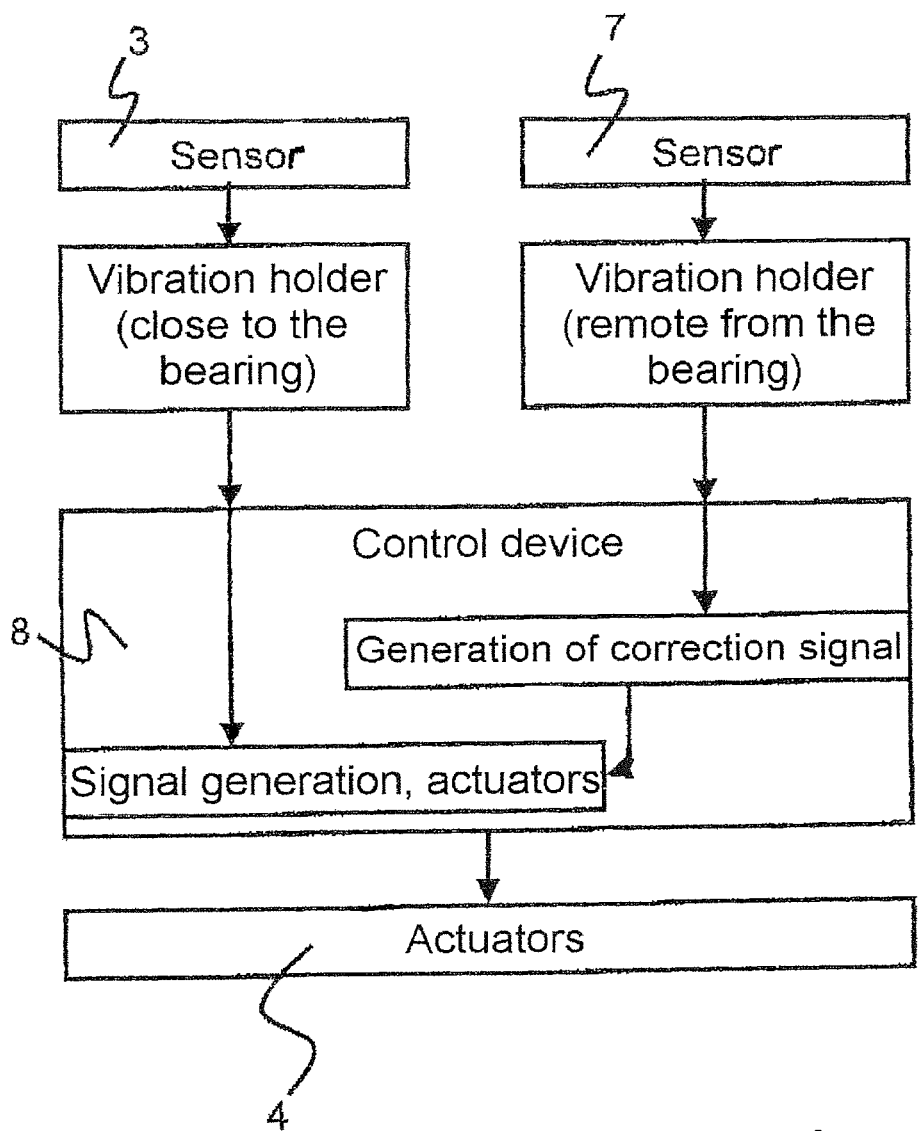
FIG. 2 shows, schematically, the major method steps for one example of an exemplary embodiment of a method for vibration isolation.

The interaction of the major components of the vibration isolation system will be explained in more detail with reference to the flowchart shown in FIG. 2. Vibration is detected via a sensor 3, and is passed to the control device. Since the sensor 3 is located close to the bearing, natural vibration of the mass to be isolated is largely masked out.

Vibration which is caused by structural vibration of the mass to be isolated, in particular natural-frequency vibration, is passed to the control device 8 via a further sensor 7 which is ideally arranged as far away from the bearing as possible, and detects position changes remotely from the bearing.

Because the natural-frequency vibration is generally in the form of sinusoidal vibration, the control complexity is generally quite low, so that a correction signal which can be added to the signal to the actuators can be generated in the control device 8. However, it may also be necessary to calculate additional transformations, depending on the configuration. In this situation, the control device 8 drives the actuators, with the drive also taking account of natural-frequency vibration of the supported mass.

It is self-evident that the invention is not restricted to a combination of the above features, but that a person skilled in the art will combine the features described above where this is worthwhile.

The invention claimed is:

1. An active vibration isolation system designed to damp a vibration of a mass, comprising:
   sensors configured to detect the vibration of the mass;
   actuators configured to damp the vibration of the mass;
   the mass, which is mounted on at least three vibration isolators configured as bearings, wherein each bearing has one associated actuator which is arranged in or on the corresponding bearing, and wherein the sensors are located close to the bearings; and at least one further sensor, arranged on the mass and positioned essentially at the same distance away from the bearings of the vibration isolation system, for detection of structural vibration of the mass; and wherein the vibration isolation system has a control device for driving the at least one actuator, in which case a compensation signal can be added to other compensation signals for active vibration isolation via the control device, in order to reduce the structural vibration of the mass to be isolated.

2. The active vibration isolation system as claimed in claim 1, wherein the mass to be isolated comprises a holder for supporting an object to be isolated.

3. The active vibration isolation system as claimed in claim 2, wherein structural vibration of the holder can be detected via the at least one further sensor.

4. The active vibration isolation system as claimed in claim 2, wherein structural vibration of the object to be isolated can be detected via at least one of the at least one sensor and a third sensor.

5. The active vibration isolation system as claimed in claim 1, wherein structural vibration of the mass to be isolated can be detected by means of the at least one further sensor in at least two degrees of freedom.

6. The active vibration isolation system as claimed in claim 1, wherein the active vibration isolation system has damping of more than 3 dB, at an excitation frequency of 5 Hz.

7. The active vibration isolation system as claimed in claim 1, wherein the active vibration isolation system has damping of more than 10 dB, at an excitation frequency of 15 Hz.

8. The active vibration isolation system as claimed in claim 1, wherein the active vibration isolation system has a load capacity of more than 1000 N.

9. The active vibration isolation system as claimed in claim 1, wherein at least one of the actuators act on the mass to be isolated without contact.

10. A method for vibration isolation of a mass which is mounted on vibration isolators configured as bearings, the method comprising:

detecting a vibration of the mass via sensors located close to the bearings;

damping the vibration of the mass via actuators, wherein each bearing has one associated actuator which is arranged in or on the corresponding bearing; and detecting structural vibration of the mass via at least one further sensor, arranged on the mass and positioned essentially at the same distance away from the bearings of the vibration isolation system, wherein the structural vibration of the mass is taken into account in the drive for the at least one actuator.

11. The method for vibration isolation as claimed in claim 10, wherein an object to be isolated is mounted on a holder, and structural vibration of the holder is detected via the at least one further sensor.

12. The method for vibration isolation as claimed in claim 10, wherein structural vibration of the object to be isolated is detected via at least one of the at least one sensor and a third sensor.

13. The method for vibration isolation as claimed in claim 10, wherein compensation signals are calculated from position changes of the mass to be isolated and are added to other compensation signals for active vibration isolation.

14. The method for vibration isolation as claimed in claim 10, wherein the structural vibration which is detected comprises natural-frequency vibration of the mass to be isolated.

15. The method for vibration isolation as claimed in claim 10, wherein the system for vibration isolation has means for storage of at least one of characteristics and families of characteristics which represent different installation configurations.

16. A platform for vibration-isolated mounting, comprising the vibration isolation system as claimed in claim 1.

* * * * *